United States Patent
Egner-Walter et al.

(10) Patent No.: US 6,360,969 B1
(45) Date of Patent: Mar. 26, 2002

(54) NOZZLE ELEMENT FOR AN AUTOMOBILE WINDSHIELD WASHER SYSTEM

(75) Inventors: Bruno Egner-Walter, Heilbronn; Bruno Campesato, Ingersheim; Gerhard Oehler, Freudental, all of (DE)

(73) Assignee: Valeo Auto-Electric Wischer und Motoren GmbH (DE)

( * ) Notice: Subject to any disclaimer, the term of this patent is extended or adjusted under 35 U.S.C. 154(b) by 0 days.

(21) Appl. No.: 09/582,563

(22) PCT Filed: Oct. 5, 1999

(86) PCT No.: PCT/EP99/07373

§ 371 Date: Sep. 14, 2000

§ 102(e) Date: Sep. 14, 2000

(87) PCT Pub. No.: WO00/24616

PCT Pub. Date: May 4, 2000

(30) Foreign Application Priority Data

Oct. 28, 1998 (DE) .......................... 198 49 687

(51) Int. Cl.$^7$ .................................. B05B 1/10
(52) U.S. Cl. .............. 239/284.1; 239/452; 239/455; 239/465; 239/576; 239/587.4; 239/602; 239/533.13
(58) Field of Search ............... 239/284.1, 284.2, 239/452, 455, 460, 576, 587.4, 602, DIG. 12, 546, 533.13, 533.15, 580, 465

(56) References Cited

U.S. PATENT DOCUMENTS

| | | | | |
|---|---|---|---|---|
| 384,306 A | * | 6/1888 | Bourdil | |
| 1,958,867 A | * | 5/1934 | Simmons | |
| 2,893,647 A | * | 7/1959 | Wortman | |
| 3,008,649 A | * | 11/1961 | Bock et al. | |
| 3,282,513 A | * | 11/1966 | Savage | |
| 3,365,138 A | * | 1/1968 | Green | |
| 3,423,025 A | * | 1/1969 | Rodger | |
| 4,113,183 A | * | 9/1978 | Stuart, Sr. | |
| 5,074,471 A | * | 12/1991 | Baumgarten et al. | |
| 5,405,063 A | * | 4/1995 | Chen | |
| 5,850,974 A | * | 12/1998 | Kettl et al. | |
| 5,855,322 A | * | 1/1999 | Py | |

FOREIGN PATENT DOCUMENTS

| | | |
|---|---|---|
| DE | 1 655 022 | 3/1971 |
| DE | 1 655 048 | 7/1971 |
| DE | 3 142 224 | 11/1983 |
| DE | 4424075 | 1/1996 |
| GB | 725 328 | 3/1955 |

* cited by examiner

Primary Examiner—David A. Scherbel
Assistant Examiner—Christopher S. Kim
(74) Attorney, Agent, or Firm—J. Gordon Lewis

(57) ABSTRACT

A nozzle element is described, which can is inserted into a nozzle body, either fixed in position or adjustably, and together with the nozzle body forms a component of a windshield wiper system of a motor vehicle. The nozzle element consists of a hard metallic, ball-like base body and a cylindrical projection formed in one piece with the body. A hose-like resilient sleeve is pulled tightly onto the body, and closes off the outer ends of transverse channels which are in flow connection with a centered flow channel. Via the channel, washing fluid for the windshield is supplied under pressure. Thereby, the resilient sleeve bulges outwards so that the fluid can flow out of the nozzle element on the inside of the sleeve and on the outside of the cylindrical projection via an annular channel formed under pressure.

20 Claims, 1 Drawing Sheet ant groove of the nozzle element, the secure axial fixation of the resilient sleeve, even for the greatest possible fluid pressure. Additionally, the annular bead brings about a reinforcement of the inner area, particularly the inner end of the resilient sleeve, so that for the normal opening area of the transverse channel or channels situated further outward, the fluid cannot flow inward but only outward.

Preferably, the external annular groove is situated at the transition from the ball-shape basic body to the cylindrical projection.

In a preferred embodiment of the invention a centering of the spray jet is achieved, in particular, by the truncated conical free end of the cylindrical projection.

An additional improvement, namely a centering and guidance of the spray jet, is achieved by splitting the spray jet here into a number of smaller individual jets, which are brought together by the appropriate shaping and channel construction and then strike the windshield all together. This increases the cleaning effect in conjunction with the motion of the windshield wiper.

Another variant of the invention, illustrated in the drawing, likewise generates a directed jet of liquid, which is wider overall than that of the other embodiments and can find use anywhere where a larger jet diameter is desired. Depending on the construction of the recess, the latter feature can also be achieved with the aforementioned variants. The channels of the aforementioned third variant can expediently run at an incline, as expressed in the drawing.

In order to make adjustments easily for an adjustable nozzle element, it is provided that a blind hole be provided, preferably running coaxially to the flow channel and opening at the free end of the cylindrical projection, into which an adjustment instrument, such as a stiff piece of wire, a nail, a spike or the like, can be inserted.

BRIEF DESCRIPTION OF THE DRAWING

Additional configurations, advantages and modes of operation of the invention result from the description of embodiments below. The drawing shows three embodiments of the invention. Represented are.

DETAILED DESCRIPTION

Figure 3:
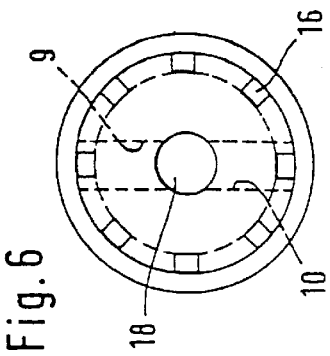
FIGS. 1–3 are variants of the nozzle element in a central longitudinal cross section in each case, the second and third variants according to FIGS. 2 and 3 being shown broken off.

The nozzle element 1 is a component of the windshield wiper system of a motor vehicle, not shown, but conventionally known. It has a ball-like base body 2 of hard material, such as metal, plastic or the like, on which a cylindrical projection 3 is placed or produced in one piece. The ball-like base body 2 is inserted or linked into a nozzle housing 4 which is known in principle and is thus indicated only by a segmented line in the drawing. One or more nozzle elements can be placed on such a nozzle body.

Figure 6:
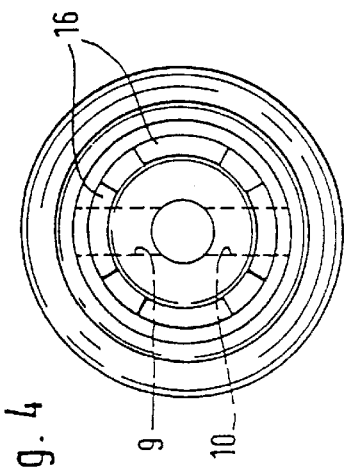
FIG. 6 is an end view of the nozzle element of FIG. 3.
Figure 5:
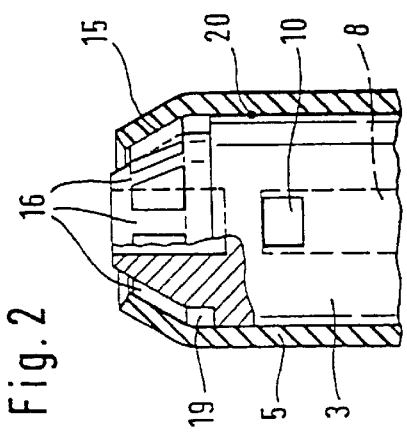
FIG. 5 is an end view of the nozzle element of FIG. 2.
Figure 4:
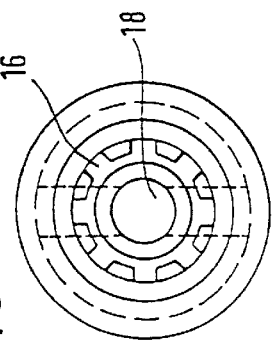
FIG. 4 is an end view of the nozzle element of FIG. 1.

In the embodiments, the cylindrical projection 3 according to FIGS. 4–6 has a cylindrical cross section and a hose-like or tube-like resilient sleeve 5 is pulled over it. The dimensioning is chosen such that the resilient sleeve 5 is pressed onto the cylindrical wall of the projection 3 with an initial tension.

A centered flow channel 6 is placed in the nozzle element 1. The centered flow channel 6 passes through the entire

NOZZLE ELEMENT FOR AN AUTOMOBILE WINDSHIELD WASHER SYSTEM

BACKGROUND

The invention pertains to a nozzle element for windshield wiper system of a motor vehicle, with a ball-like body that transitions into a cylindrical projection with a central flow channel. Windshield wiper systems are standard equipment on motor vehicles today. For reasons of cost and also because it is readily available, water is used as the spray and washing fluid. In the cold season, however, the water can freeze, for which reason additives in the form, for instance, of alcohol and other volatile substances, can be added, at least in that season. There are also nozzles with heating, but here considerable expense is necessary.

In the case of water with a volatile additive, care must be taken that the latter does not evaporate, with the consequence that the nozzle freezes up. Therefore, so-called rubber-lip valves were developed, as described, for instance, in DE 39 35 318 A1 or DE 44 24 075 A1.

The disadvantage of these rubber-lip valves, which indeed do effectively prevent the evaporation of alcohol or the like, is that the spray jet exits from the valve in a relatively uncontrolled manner.

Accordingly there exists the problem of refining a nozzle element having the advantages of rubber-lip valve so that a controlled jet from the nozzle onto the windshield is possible.

SUMMARY

To solve this problem, it is proposed according to the invention that the nozzle element includes a "ball-like body" inserted into a nozzle body of known type, which can be deduced in principle, for instance, from the cited publications, for which reason a presentation in the context of the present invention and a detailed description can be dispensed with.

In the nozzle element according to the invention the washing fluid is supplied via the centered flow channel and then reaches the inner surface of the tubular resilient sleeve via at least one transverse channel. In case of non-use of the washing system or low fluid pressure, the resilient sleeve closes the outer opening of the transverse channel or of each transverse channel, so that no fluid can escape or evaporate. If, however, a sufficiently high pressure is input into the flow channel possibly, for instance, with the aid of a pump that can be operated by the driver, then the resilient sleeve bulges outward and the fluid can then flow out in the annular space between the sleeve and the cylindrical projection towards the open end of the nozzle element. In contrast to the flat, directly contacting lips of the known rubber-lip valve, which generate a flat jet of undefined cross-sectional shape, the fluid escapes in an orderly manner from the nozzle element in an annular jet. Thereby the jet direction can then be securely adjusted and the impact point on the windshield precisely fixed, even in case of a nozzle element seated adjustably in the nozzle body.

If it is stated that the tubular resilient sleeve reaches roughly up to the free end of the cylindrical projection, then there is the possibility of either actually extending the sleeve up to the free end or causing the sleeve to end slightly before that point or possibly allowing the sleeve to jut slightly past the free end surface. In the illustrated embodiments, however, the latter-mentioned alternative is not provided.

A refinement of the invention includes an annular bead which ensures, in conjunction with the circumferential annuball-like base body 2 and extends up to roughly in the middle of the cylindrical projection 3. More specifically, the centered flow channel 6 consists of a conically tapering channel part 7 and a following cylindrical channel part 8 essentially inside the cylindrical projection 3. At its outer end, the conical channel part 7 according to FIG. 1 may be widened in the manner of a bevel.

Two transverse channels 9 and 10 offset by 180° extend into the inner end area of the cylindrical channel part 8. The channels 9 and 10 end at opposing points of the cylindrical outer surface 11 of the cylindrical projection 3. Both are tightly closed off by the resilient sleeve 5.

Figure 1:
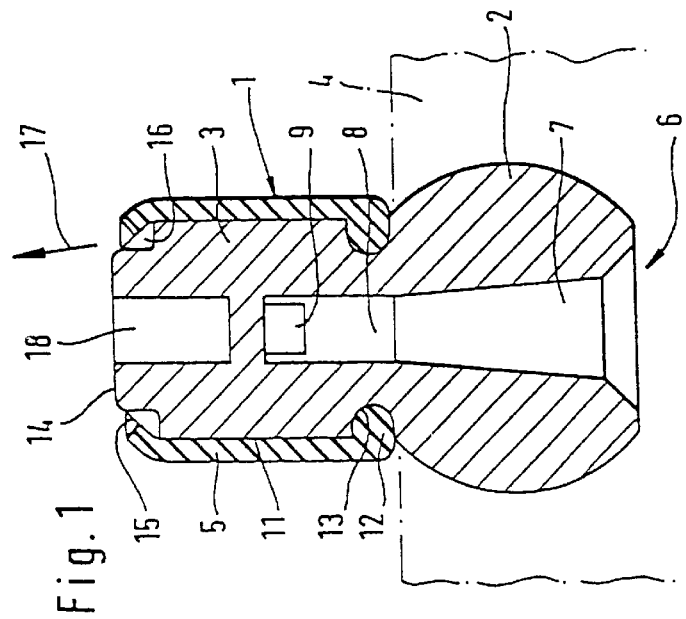

The tubular resilient sleeve 5 is equipped at an end facing the ball-like base body 2 with an annular bead 12 turned radially inwards which is inserted into a circumferential annular groove 13 of the cylindrical projection 3. In the embodiment of FIG. 1, the annular groove 13 is located directly at the transition from the ball-like base body 2 to the cylindrical projection 3.

Figure 2:
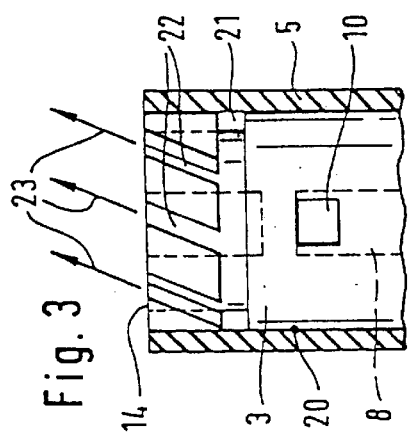

In the embodiment according to FIGS. 1 and 2, the free end of the cylindrical projection 3 is shaped in the form of a truncated cone. Consequently, the free end of the resilient sleeve 5 is bent somewhat inward due to its internal tension and following the truncated cone which, also is under tension, albeit a lower one.

In both cases, the outer end of the resilient sleeve 5 reaches approximately up to the end surface 14, flat in both variants. In contrast to FIGS. 1 and 2, no truncated conical end is provided in the free end area of the cylindrical projection 3 in the variant according to FIG. 3. Therefore, the resilient sleeve 5 runs cylindrical up to the end surface 14 there.

On the truncated conical outer surface 15, several recesses 16 are placed according to the variants of FIGS. 1 and 2, preferably uniformly distributed over the surface 15. The recesses 16 are covered only partially by the free end of the resilient sleeve 5, more specifically, on an inside part, so that the fluid can escape in the direction of the arrow 17. The jet direction and also the cross section of each small component jet can be influenced by appropriate formation of the cylindrical projection 3, the recesses 16 and the free end of the resilient sleeve 5.

In order to adjust the jet direction precisely, an additional blind hole 18 in the cylindrical projection 3, preferably running coaxially to the flow channel 6, is made from the flat end face 14 of the cylindrical projection 3. By inserting the end of a wire, a spike or a nail-like object, the nozzle element 1 can be adjusted in case of a rotatable seating of the base body 2 in the nozzle body.

In the embodiment according to FIG. 2, an annular groove 19 is located roughly at the transition from the cylindrical projection 3 to its truncated cone 15. The inner or in the drawing, the lower ends of the recesses 16 have a flow connection to this annular groove 19.

If the pressure in the centered flow channel 6 and thus, also in the transverse channels 9 and 10, is high enough to overcome the pressing force of the resilient sleeve 5 against the cylindrical projection 3, then the fluid enters the annular groove 19 via the annular channel 20 created in this way. Via the outer ends of the recesses 16, a number of spray jets corresponding to the number of recesses exit in the direction of the arrow 17. As soon as the pump pressure or, in general terms, the pressure in the centered flow channel 6 becomes smaller or disappears entirely, the resilient sleeve again lies tightly against the exit ends of the transverse channel 9, 10 and closes the channels 9 and 10 off. Thereby, neither an unintentional emptying nor an evaporation of the fluid is possible by way of the nozzle element 1. Freezing up of the nozzle element is thereby reduced and heating of the nozzle can be saved.

In the embodiment according to FIG. 3, an annular groove 21 is placed in the free end area of the cylindrical projection 3 at some distance from the free end surface 14. As in the other embodiments, fluid enters into the groove 21 from the annular channel 20 forming in case of a positive pressure. The inner ends of several channels 22, once again preferably distributed uniformly on the circumference, open into the annular groove 21. In the embodiment, the channels 22 run at an angle of inclination of, for instance, 45° with the central axial line of the cylindrical projection 3. Consequently the small fluid streams exit in the direction of the arrows 23. Thereby a certain spreading of the jet is achieved, in contrast to the other variants, where the small jets rather tend to run together towards the windshield.

What is claimed is:

1. A nozzle element for a windshield wiper system of a motor vehicle comprising:

a ball-shaped base body pivotably engageable within a nozzle housing for adjustably directing a jet of liquid to strike a windshield to be sprayed, the body having a transition into a cylindrical projection with a free end spaced from the nozzle housing and a centered flow channel, the free end having a plurality of recesses distributed uniformly around a circumference, the flow channel constructed as a blind aperture passing through the ball-shaped base body and an adjacent part of the cylindrical projection, a blind end of the flow channel having at least one transverse channel extending to an outer surface of the cylindrical projection; and a tubular resilient sleeve tightly closing off the at least one transverse channel at the outer surface and reaching substantially up to a free end of the cylindrical projection positionable on the cylindrical projection.

2. The nozzle element according to claim 1 further comprising:

the tubular resilient sleeve including an annular bead extending radially inward; and the cylindrical projection including an outer circumferential annular groove, wherein the annular bead of the tubular resilient sleeve is engageable within the outer circumferential annular groove.

3. The nozzle element according to claim 2 wherein the outer annular groove is located at the transition from the ball-shaped base body to the cylindrical projection.

4. The nozzle element according to claim 1 wherein the free end of the cylindrical projection is a truncated cone and an outer end of the tubular resilient sleeve engages at least part of the truncated cone.

5. The nozzle element according to claim 4 further comprising:

the plurality of recesses distributed uniformly around a circumference of the truncated cone, wherein the plurality of recesses and the at least one transverse channel are spaced longitudinally apart along a length of the cylindrical projection.

6. The nozzle element according to claim 5 wherein the plurality of recesses are encircled at least in part by the resilient sleeve.

7. The nozzle element according to claim 5 further comprising:

an annular groove in fluid communication with the recesses formed at the transition from the cylindrical projection to the truncated cone, the annular groove spaced longitudinally apart from the plurality of recesses and the at least one transverse channel along the length of the cylindrical projection.

8. The nozzle element according to claim 1 further comprising:

the cylindrical projection including a free end opposite from the ball-shaped base body, an annular groove spaced from the free end, and a plurality of longitudinal channels distributed uniformly along a circumference of the cylindrical projection extending from a position spaced longitudinally from the annular groove to the free end of the cylindrical projection, the annular groove spaced longitudinally apart from the plurality of recesses and the at least one transverse channel along the length of the cylindrical projection.

9. The nozzle element according to claim 8 further comprising:

each of the plurality of longitudinal channels having a longitudinal axis, each longitudinal axis inclined with respect to an axial center line of the cylindrical projection.

10. The nozzle element according to claim 9 wherein each longitudinal axis is inclined with respect to the axial center line from about 30° to about 60°.

11. The nozzle element according to claim 1 wherein the centered flow channel is formed tapering conically inwards in cross section along a portion of a longitudinal length within the ball-shaped body and is cylindrical in cross section along another portion of the longitudinal length within the cylindrical projection.

12. The nozzle element according to claim 1 wherein the at least one transverse channel further comprises:

two transverse channels offset by 180° with respect to one another.

13. The nozzle element according to claim 12 wherein the two transverse channels have a square cross-section.

14. The nozzle element according to claim 1 further comprising:

a blind adjustment aperture extending from a free end of the cylindrical projection and coaxial with respect to the centered flow channel for changing an angular orientation of the ball-shaped body with respect to the nozzle housing.

15. A nozzle for a windshield wiper system of a motor vehicle comprising:

a bulbous body having a spherical portion and a stem portion extending from the spherical portion, the spherical portion adjustably engageable within a nozzle housing, the stem portion having a first end opposite from the spherical end, a longitudinal axis, a side surface, and at least one recess formed at the first end, the first end adjustable to direct a stream of fluid to strike a windshield to be sprayed;

a fluid conduit extending through the bulbous body for defining a fluid path, the conduit having a first opening formed in the spherical portion of the bulbous body and a second opening formed in the side surface of the stem portion of the bulbous body; and a resilient sleeve engaged with the side surface to encircle the second opening and the at least one recess, the sleeve radially expandable with respect to the stem portion in response to positive fluid pressure in the fluid conduit to place the at least one recess in fluid communication with the fluid conduit to operate as a normally closed valve to prevent discharge through the at least one recess in an absence of sufficient fluid pressure within the fluid conduit to expand the resilient sleeve.

16. The nozzle of claim 15 wherein the fluid conduit further comprises:

a passage extending from the first opening, through the spherical portion, and terminating at a blind end in the stem portion, the passage extending coaxially with respect to the longitudinal axis of the stem; and at least one channel extending from the passage adjacent the blind end to the second opening.

17. The nozzle of claim 15 further comprising:

the bulbous body including an annular groove formed at a transition between the spherical portion and the stem portion; and the resilient sleeve including an annular bead mountable within the annular groove to maintain the resilient sleeve in operable engagement with the stem portion.

18. The nozzle of claim 15 further comprising:

the stem portion having a reduced diameter at the first end.

19. The nozzle of claim 15 further comprising:

the stem portion having a reduced diameter extending coaxially with a truncated cone adjacent an outer end; and the at least one recess defining a notch in the truncated cone.

20. The nozzle of claim 15 further comprising:

the stem portion having a reduced diameter extending coaxially with a plurality of radial projections extending outwardly to define a plurality of gaps formed therebetween; and the at least one recess defining a plurality of recesses formed, at least in part, by the plurality of gaps.

* * * * *